United States Patent
Kobyakov et al.

(12)

(10) Patent No.: US 9,417,397 B2
(45) Date of Patent: Aug. 16, 2016

(54) CONDUCTIVE ASSEMBLIES SECURING OPTICAL FIBERS TO FERRULES BY THERMALLY SECURING BONDING AGENTS WITHIN FIBER OPTIC CONNECTOR HOUSINGS, AND RELATED METHODS AND ASSEMBLIES

(71) Applicant: CORNING OPTICAL COMMUNICATIONS LLC, Hickory, NC (US)

(72) Inventors: Andrey Kobyakov, Hickory, NC (US); Aramais Zakharian, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 244 days.

(21) Appl. No.: 14/265,716

(22) Filed: Apr. 30, 2014

(65) Prior Publication Data
US 2015/0316728 A1    Nov. 5, 2015

(51) Int. Cl.
*G02B 6/38* (2006.01)

(52) U.S. Cl.
CPC ............... *G02B 6/38* (2013.01); *G02B 6/3861* (2013.01)

(58) Field of Classification Search
CPC .... G02B 6/4204; G02B 6/262; G02B 6/4296; G02B 6/4239; G02B 6/3813; G02B 6/4214; G02B 6/2551; G02B 6/3861; G02B 6/0006; G02B 6/243; G02B 6/403; G02B 6/3833
USPC .......... 156/272.6, 272.8, 379.6, 379.7, 379.1, 156/221, 294, 295, 379.8, 423, 499, 500
See application file for complete search history.

(56) References Cited

U.S. PATENT DOCUMENTS

| | | | | |
|---|---|---|---|---|
| 4,510,005 A | * | 4/1985 | Nijman | B29C 35/0805 156/221 |
| 2014/0321812 A1 | * | 10/2014 | Bauco | G02B 6/3855 385/78 |

OTHER PUBLICATIONS

Haas Laser Technologies Inc., 19mm Beam Directing & Positioning, retrieved from internet on Apr. 24, 2014, 2 pages.
Primes, Beam Dissipation Absorber Datasheet, retrieved from internet on Apr. 24, 2014, 1 page.
TDK, Radio Wave Absorbers, Issue date Feb. 2008, 19 pages.
Thorlabs, Beam Blocks and Traps, retrieved from internet on Apr. 24, 2014, 3 pages.

* cited by examiner

*Primary Examiner* — Jacob T Minskey
*Assistant Examiner* — Vishal I Patel

(57) ABSTRACT

Conductive assemblies are disclosed for bonding an optical fiber in a ferrule by mounting the ferrule of a fiber optic connector in the conductive assembly and using the conductive assembly to convert laser beam energy to heat and apply the heat to a portion of a fiber optic ferrule sufficient to bond the optical fiber in the ferrule. In an exemplary method, an optical fiber is disposed in a bore of a ferrule. A portion of the ferrule is disposed in a conductive assembly, such that a conductive element contacts a portion of the length of the ferrule. A laser beam absorber absorbs light energy from a laser beam, and converts the energy to heat. The conductive element transfers the heat energy from the laser beam absorber to the ferrule, thereby heating the bonding agent and bonding the optical fiber in the bore of the ferrule.

15 Claims, 9 Drawing Sheets

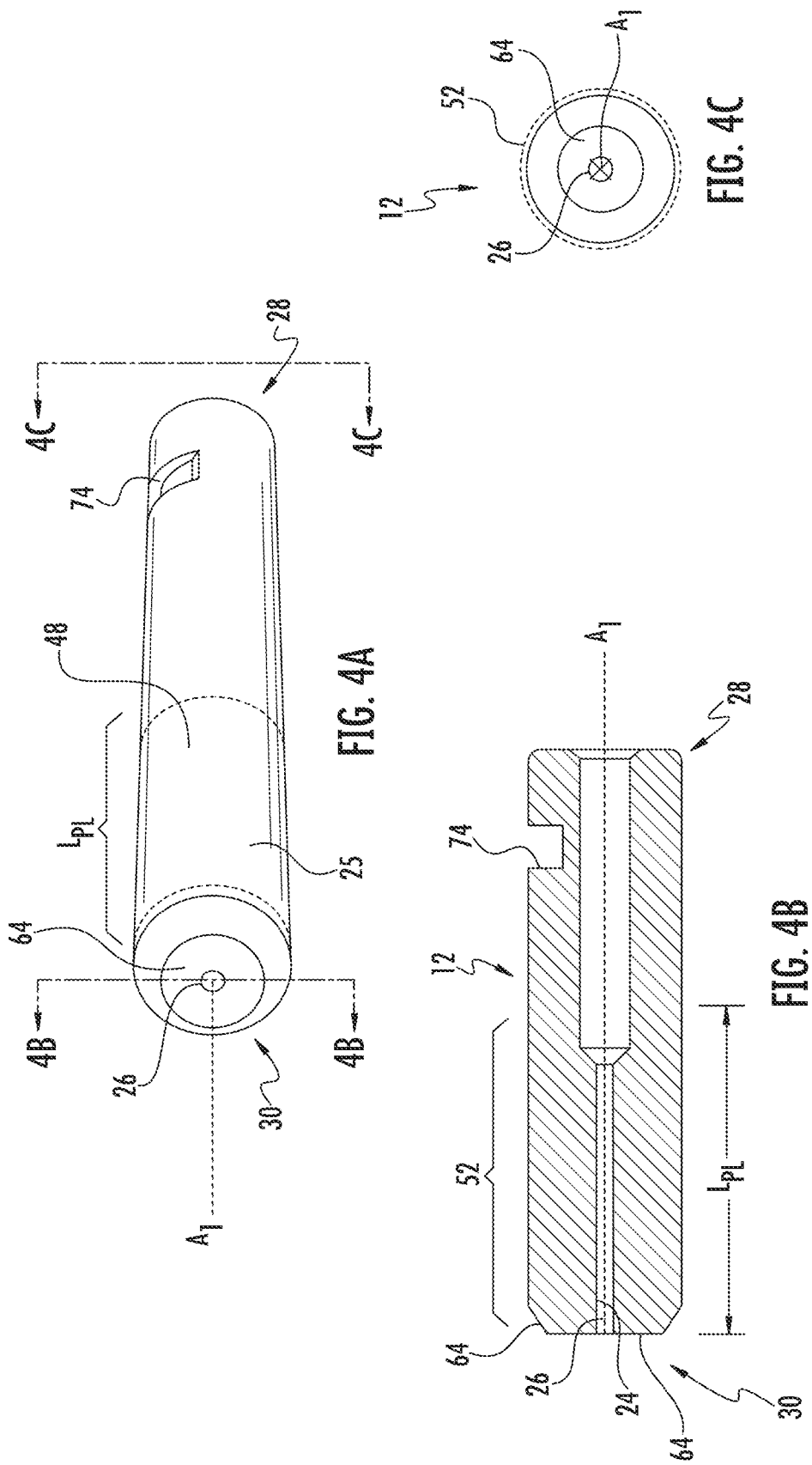

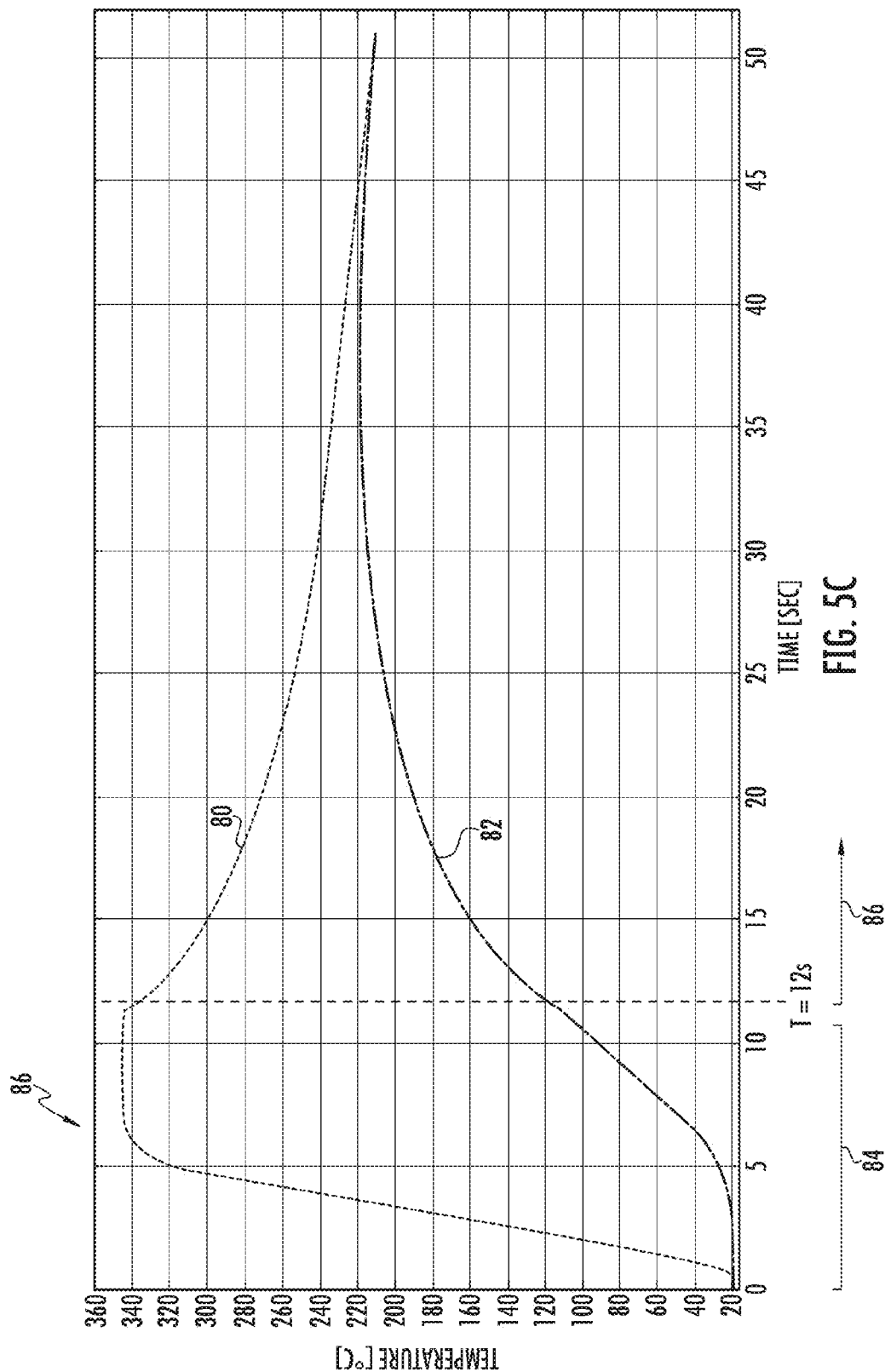

CONDUCTIVE ASSEMBLIES SECURING OPTICAL FIBERS TO FERRULES BY THERMALLY SECURING BONDING AGENTS WITHIN FIBER OPTIC CONNECTOR HOUSINGS, AND RELATED METHODS AND ASSEMBLIES

BACKGROUND

The field of the disclosure relates generally to fiber optic equipment and more particularly to methods and assemblies for securing an optical fiber to a ferrule, which may be used within fiber optic connectors.

Benefits of optical fibers include extremely wide bandwidth and low noise operation. In cases where high bandwidth is required between two interconnection locations, fiber optic cables having fiber optic connectors may be used to communicate information between these locations. The fiber optic connectors may also be used to conveniently connect and disconnect the fiber optic cables from the interconnection locations when maintenance and upgrades occur.

Each of the fiber optic connectors may include a ferrule assembly having a ferrule and an optical fiber. The ferrule has several purposes. The ferrule includes an internal pathway, called a ferrule bore, through which the optical fiber is supported and protected. The ferrule bore also includes an opening at an end face of the ferrule. The opening is where an optical surface of an end portion of the optical fiber may be precisely located to be proximate to an optical surface of an end portion of another optical fiber of a complementary connector. The end portion of the optical fiber needs to be precisely secured to the ferrule to prevent movement within the ferrule bore that may otherwise result in an uncertain position between the optical surface of the optical fiber and the optical fiber of the complementary connector. In this regard, an unwanted gap may develop between the proximate optical fibers and signal loss, otherwise known as attenuation, may occur.

A bonding agent, for example an epoxy resin, is one approach to secure the optical fiber to the ferrule, but there are manufacturing challenges with this approach. Specifically, the ferrule is often first assembled with a fiber optic connector housing. The optical fiber and an uncured bonding agent are later inserted within the ferrule bore. The optical fiber may then be secured to the ferrule by curing the bonding agent. Curing is a chemical process specific for different types of bonding agents and may involve the bonding agent forming cross-linked thermoset structures, thus enabling secure bonds to be created between proximate objects. For many bonding agents compatible to secure the optical fiber to the ferrule, heat is required to bring the temperature of the bonding agent to a securing temperature, which may be from approximately eighty-five (85) to two hundred (200) degrees Celsius (° C.) for epoxy resins, to facilitate the bonding required of the bonding agent during curing. If the temperature does not reach this value, then a reduced percentage of bonding may occur, and the optical fiber may be inadequately secured to the ferrule. To provide the heat to elevate the temperature, the optical fiber and ferrule are typically heated in an oven relatively slowly, for example approximately twenty (20) minutes, to elevate the temperature of the bonding agent without damaging the fiber optic housing, which may be damaged by applying more intense heat to speed curing. The relatively slow heating process to protect the housing imposes a significant restriction on manufacturing efficiency.

Other heating devices, such as lasers, have been used to heat ferrules, and thereby cure the bonding agent disposed therein, so that faster curing can occur. However, for ferrules mostly enclosed within fiber optic connector housings, lasers are used only to directly heat merely a tip of the ferrule to avoid damaging the fiber optic connector housing. It can be a challenge to obtain sufficient adhesion/bonding and to avoid intense localized heating of the bonding agent with such approaches.

It is noted that other examples of the bonding agents, for example, adhesives and/or cohesives, may be used without the curing involving cross-linked thermoset materials. These other bonding agents may still be thermally activated by heating to a securing temperature so that the optical fiber may be secured to the ferrule. As such, the technical challenge remains the same, wherein heat needs to be delivered to the bonding agent without damaging the fiber optic connector housing.

What is desired is a more cost-effective and efficient method to secure the optical fiber to the ferrule to minimize attenuation without damaging the fiber optic connector housing.

No admission is made that any reference cited herein constitutes prior art. Applicant expressly reserves the right to challenge the accuracy and pertinency of any cited documents.

SUMMARY

Embodiments disclosed herein include conductive assemblies for securing optical fibers to ferrules by thermally securing bonding agents within fiber optic connector housings. Related methods, components, and apparatuses are also disclosed. In an exemplary method, an optical fiber is disposed in a bore of a ferrule. A portion of the ferrule is disposed in a conductive assembly, such that a conductive element contacts a portion of the length of the ferrule. A laser beam absorber absorbs light energy from a laser beam, and converts the energy to heat. The conductive element, connected to the laser beam absorber, transfers the heat energy from the laser beam absorber to the ferrule, thereby heating the bonding agent disposed between the optical fiber and the ferrule bore. In a non-limiting example, the conductive element may surround a front end of the ferrule without contacting the front end, such that the heat energy is transferred to the bonding agent without applying heat directly to the front end (or at least a ferrule tip at the front end). Further, the conductive element may be configured to transfer sufficient heat energy to the front end of the ferrule to bond the optical fiber in the bore of the ferrule without damaging other components of the fiber optic connector connected to a rear end of the ferrule.

One embodiment of the disclosure relates to a method of bonding an optical fiber in a ferrule. The method comprises disposing an optical fiber and a bonding agent in a bore of a ferrule. The method further comprises disposing the ferrule at least partially in a conductive assembly such that a conductive element of the conductive assembly contacts a portion of the ferrule. The method further comprises directing a laser beam at a laser beam absorber of the conductive assembly. The laser beam absorber is thermally connected to the conductive element. Energy from the laser beam is absorbed by the laser beam absorber and is transferred through the conductive element to the ferrule to bring the bonding agent to a securing temperature. The method further comprises cooling the bonding agent to secure the optical fiber in the bore of the ferrule.

Another embodiment of the disclosure relates to a conductive assembly for bringing a bonding agent disposed in a bore of a ferrule to a securing temperature that allows bonding of an optical fiber to the ferrule. The conductive assembly comprises a laser beam absorber configured to absorb energy from a laser beam as heat. The conductive assembly further comprises a conductive element connected to the laser beam absorber and configured to contact a portion of the ferrule when the ferrule is at least partially disposed in the conductive assembly. The conductive element is also configured to transfer heat from the laser beam absorber to the ferrule when in contact therewith to bring the bonding agent to the securing temperature.

An additional embodiment of the disclosure relates to a system for producing a fiber optic cable assembly. The system comprises a ferrule having a bore with a bonding agent disposed within. The system further comprises an optical fiber disposed within the bore of the ferrule and at least partially surrounded by the bonding agent. The system further comprises a laser configured to emit a laser beam. The system further comprises a conductive assembly. The conductive assembly comprises a laser beam absorber configured to absorb energy from the laser beam as heat. The conductive assembly further comprises a conductive element connected to the laser beam absorber and contacting a portion of the ferrule. The conductive element is configured to transfer heat from the laser beam absorber to the ferrule to activate the bonding agent and thereby secure the optical fiber to the ferrule.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 4A-4C are a perspective view, cutaway side view, and front view, respectively, of the ferrule depicted in FIGS. 1A and 1B; and FIGS. 5A-5C illustrate heating and cooling profiles, and a combined heating and cooling profile of the ferrule and the connector housing of FIG. 1B over time as laser beam energy is applied to the laser beam absorber and propagated through the conductive element and into the ferrule as heat.

DETAILED DESCRIPTION

Various embodiments will be further clarified by the following examples. Embodiments disclosed herein include conductive assemblies for securing optical fibers to ferrules by thermally securing bonding agents within fiber optic connector housings.

Figure 1A:
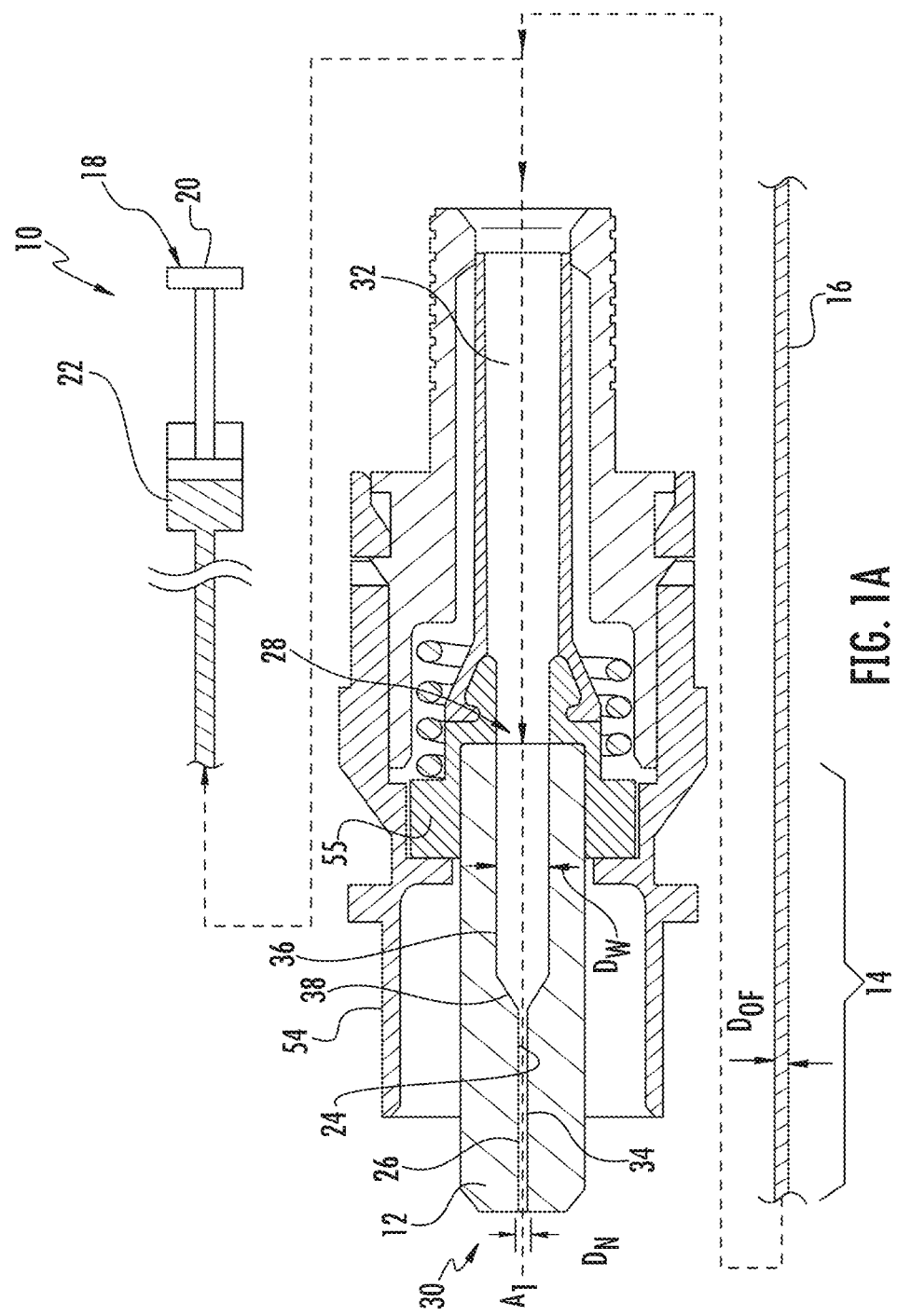
FIG. 1A is a cutaway view of an exemplary fiber optic connector sub-assembly along an optical axis of a ferrule and an end portion of an optical fiber adjacent the fiber optic connector sub-assembly.

In this regard, FIG. 1A is a cutaway view of an exemplary fiber optic connector sub-assembly 10 along an optical axis $A_1$ of a ferrule 12 being prepared to be secured to an end portion 14 of an optical fiber 16 (the optical fiber 16 being depicted adjacent and unsecured as part of the fiber optic connector sub-assembly 10). An exemplary insertion device 18, for example a syringe 20, is adjacent to the exemplary fiber optic connector sub-assembly 10. The insertion device 18 contains a bonding agent 22 to be used to secure the optical fiber 16 to the ferrule 12. The bonding agent 22 may be loaded into the ferrule 12 by the ferrule manufacturer and stored therein for a significant period of time (e.g., at least a day, a week, a month, etc.) before putting together the fiber optic connector sub-assembly 10. Alternatively, the bonding agent 22 may be loaded into the ferrule 12 at the time of putting together the fiber optic connector sub-assembly 10.

Specifically, the ferrule 12 comprises an inner surface 24 forming a ferrule bore 26 extending through the ferrule 12 from a rear end 28 to a front end 30 of the ferrule 12. The ferrule bore 26 will be used to precisely position the end portion 14 of the optical fiber 16 for establishing optical connections with other optical devices (not shown). The insertion device 18 may be inserted through the inner passageway 32 of the fiber optic connector sub-assembly 10 to dispose at least a portion of the bonding agent 22 within the ferrule bore 26. In this example, the ferrule bore 26 includes a narrow bore section 34 having a diameter $D_N$ at the front end 30 of the ferrule 12 and a wide bore section 36 having a diameter $D_W$, which is larger than $D_N$, at the rear end 28 of the ferrule 12. The end portion 14 of the optical fiber 16 may also be placed in the ferrule bore 26 with the bonding agent 22, which still remains activated (e.g., uncured). In other embodiments, the ferrule bore 26 may not include a wide bore section and, therefore, have a diameter $D_N$ along the entire length or substantially entire length of the ferrule bore 26.

Still referring to FIG. 1A, end portion 14 of the optical fiber 16 may have a diameter $D_{OF}$ which is less than the diameter $D_N$ of the narrow bore section 34. The optical fiber 16 may be inserted into the wide bore section 36 at the rear end 28 of the ferrule 12. As the optical fiber 16 is inserted into the ferrule 12, a funnel section 38 (or "transition section") of the ferrule bore 26 disposed between the wide bore section 36 and the narrow bore section 34 guides an end of the optical fiber 16 into the narrow bore section 34. In one embodiment, the diameter $D_{OF}$ is within one micron of the diameter $D_N$. In this manner, the inner surface 24 of the ferrule 12 may precisely hold the end portion 14 of the optical fiber 16 within the ferrule bore 26 and provide close proximity between the two objects, so that the end portion 14 of the optical fiber 16 and the inner surface 24 of the ferrule 12 may be more easily secured by the bonding agent 22. It is desirable to be able to uniformly heat the bonding agent 22 disposed between the inner surface 24 of the narrow bore section 34 and the portion of the optical fiber 16 disposed in the narrow bore section 34 without applying excessive heat to other components of the fiber optic connector sub-assembly 10.

Figure 1B:
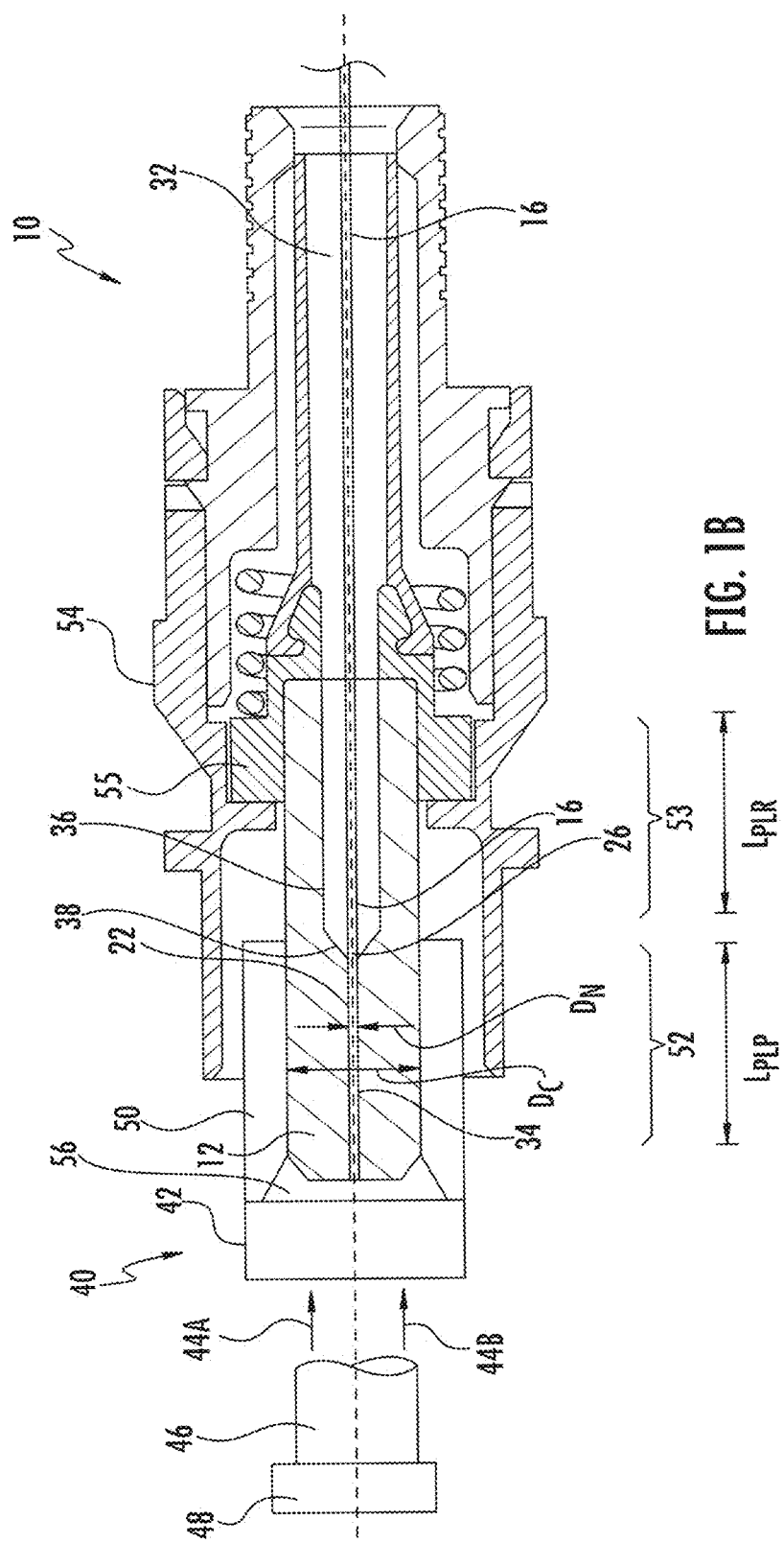
FIG. 1B depicts the exemplary fiber optic connector sub-assembly of FIG. 1A, wherein the ferrule is disposed in an exemplary conductive sub-assembly configured to thermally cure a bonding agent to thereby secure the end portion of the optical fiber to the ferrule.

In this regard, FIG. 1B depicts the exemplary fiber optic connector sub-assembly 10 of FIG. 1A, wherein the ferrule 12 is disposed in an exemplary conductive assembly 40 configured to thermally cure the bonding agent 22 to thereby secure the end portion 14 of the optical fiber 16 to the ferrule 12. The conductive assembly 40 is disposed around the front end 30 of the ferrule 12. The conductive assembly 40 includes a laser beam absorber ("LBA") 42 that receives exemplary light rays 44A, 44B of a laser beam 46 emitted by a laser 48. The LBA 42 absorbs the energy from the light rays 44A, 44B, and converts the energy into heat. The absorbed heat is transferred from the LBA 42 through a conductive element 50, which is in thermal contact with a partial length 52 of ferrule 12. The heat travels through at least a partial length 52 of ferrule 12 by heat transfer to the narrow bore section 34 of ferrule bore 26 to elevate a temperature of the bonding agent 22. In order to prevent the end portion 14 of the optical fiber 16 from movement within the ferule bore 26, the partial (or entire) length 52 of ferrule 12 is disposed at least partially within a fiber optic connector housing 54 of the fiber optic connector sub-assembly 10. Accordingly, a portion of the conductive element 50 is sized to be disposed in a gap 56 disposed between the fiber optic connector housing 54 and the ferrule 12 without thermally contacting the fiber optic connector housing 54.

As the temperature of the bonding agent 22 is raised by the light rays 44A, 44B of a laser energy of the laser beam 46, the bonding agent 22 begins to activate (e.g., cure) above a certain securing/curing temperature specific to the bonding agent 22. Curing may be a chemical process wherein the bonding agent 22 forms cross-linked thermoset structures, thus enabling secure bonds to be created between proximate objects, for example between the ferrule 12 and the end portion 14 of the optical fiber 16. In this regard, when the bonding agent 22 activates within the narrow bore section 34 of ferrule bore 26 in the at least a partial length 52 of the ferrule 12, then the optical fiber 16 may be secured to the ferrule 12. It is also noted that in some embodiments the bonding agent 22 may comprise, for example, thermoplastics and/or inorganics which may be heated to the securing temperature enabling secure bonds to be created between the ferrule 12 and the end portion 14 of the optical fiber 16.

Figure 2A:
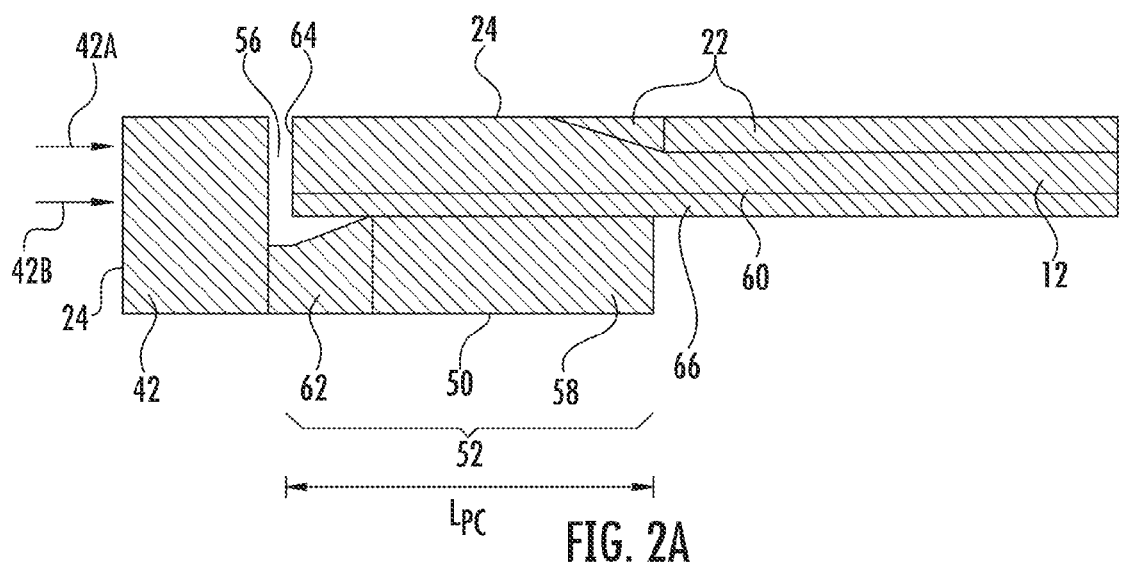
FIGS. 2A and 2B are partial cutaway views of the exemplary fiber optic ferrule disposed in the exemplary conductive sub-assembly of FIG. 1B.

Referring now to FIG. 2A, a detailed view of the conductive assembly 40 and a portion of fiber optic connector sub-assembly 10 is illustrated. As can be seen in this example, conductive element 50 includes a conductor contact element 58 configured to receive and thermally contact an outer surface 60 of the partial length 52 of ferrule 12. In this embodiment, conductive element 50 also includes a conductor connecting element 62 that thermally connects the conductor contact element 58 to the LBA 42. Although the conductor contact element 58 and conductor connecting element 62 are formed as a single part, the conductor contact element 58 and conductor connecting element 62 may be formed as separate parts in other embodiments. It should also be understood that, in other embodiments, the LBA 42 or a portion thereof may also be formed as a single part with the conductive element 50 or a portion thereof.

As can be seen in FIG. 2A, the conductor connecting element 62 does not thermally contact any part of the ferrule 12. It can also be seen from FIG. 2A that a ferrule tip 64 disposed at the front end 30 of the ferrule 12 also does not thermally contact any part of the conductive assembly 40. In this manner, a maximum amount of heat can be applied to the bonding agent 22 through the partial length 52 of ferrule 12, while minimizing the amount of heat that is delivered to the tip 64 of ferrule 12, to avoid damaging the tip 64. To aid in insertion and removal of the partial length 52 of ferrule 12 into conductive element 50, a conductive lubricant 66 may be applied to the ferrule 12 and/or the conductive element 50 prior to insertion of the ferrule 12 into the conductive element 50. The conductive lubricant 66 prevents the ferrule 12 from being damaged by friction caused by insertion or removal of the ferrule 12 with respect to the conductive element 50. Because the lubricant 66 is conductive, however, thermal transfer of energy from light rays 44A, 44B from laser beam 46 through the conductive -assembly 40 and into bonding agent 22 is not significantly impeded.

Before using the conductive assembly 40 to secure the optical fiber 16 in the ferrule 12, the optical fiber 16 and bonding agent 22 are first inserted into the ferrule 12. With reference back to FIG. 1A, the bonding agent 22 may be disposed within the ferrule bore 26 of the ferrule 12. The ferrule bore 26 is formed by the inner surface 24 of the ferrule 12. The bonding agent 22 will secure the end portion 14 of the optical fiber 16 to the inner surface 24 of the ferrule 12. The ferrule bore 26 may extend through the ferrule 12 from the rear end 28 to the front end 30. The ferrule 12 is at least partially disposed within and supported by the fiber optic connector housing 54. In one embodiment, at least 40% of the ferrule 12 is disposed within the fiber optic connector housing 54. The fiber optic connector housing 54 provides an interface for the user to connect and disconnect the fiber optic connector sub-assembly 10. The fiber optic connector housing 54 together with a ferrule holder 55 also protects the end portion 14 of the optical fiber 16 once the end portion 14 is installed within the fiber optic connector sub-assembly 10. The fiber optic connector housing 54 also protects the ferrule 12 from lateral impacts, which could damage the fiber optic connector sub-assembly 10. Accordingly, the fiber optic connector housing 54 may be made of a strong material, for example, a plastic such as high-density polyethylene (HDPE) or polyether block amide (PEBA). Accordingly, the fiber optic connector housing 54 is not designed to experience relatively high temperatures, for example, above 125° C. It is noted that temperatures above 125° C. are associated with the securing temperature of at least one embodiment of the bonding agent 22.

The insertion device 18 may be used to dispose the bonding agent 22 into the ferrule bore 26 of the ferrule 12. The bonding agent 22 may be inserted into the ferrule bore 26 in the same direction as the end portion 14 of the optical fiber 16 is inserted into the ferrule bore 26. In this way, the optical fiber 16 may pull or entrain the bonding agent 22 through the ferrule bore 26 to ensure there is relatively uniform or substantially uniform distribution of the bonding agent 22 through the ferrule bore 26. The end portion 14 of the optical fiber 16 is cleaved at the front end 30 of the ferrule 12; thus the optical fiber 16 may be inserted through the ferrule bore 26 of the ferrule 12 from the rear end 28 to the front end 30. Accordingly, the insertion device 18, which in one embodiment may be a syringe 20, may be inserted carefully through the inner passageway 32 of the fiber optic connector housing 54 to the rear end 28 of the ferrule 12 where the bonding agent 22 may be inserted into the ferrule bore 26.

With continued reference to FIGS. 1A and 1B, the bonding agent 22 may be in liquid, powder, or gel form when disposed into the ferrule bore 26, to make disposition into the ferrule bore 26 efficient. The bonding agent 22 may be an adhesive or cohesive compatible with materials used for the ferrule 12 and the optical fiber 16, while providing sufficient strength to prevent movement of the optical fiber 16 in the ferrule bore 26 after being activated (e.g., cured). In one embodiment, the bonding agent 22 may be an epoxy resin requiring heat to be elevated to a securing temperature in order to provide the mechanical bonding properties to prevent movement of the optical fiber 16 within the ferrule bore 26. In some examples, the securing temperature for the bonding agent 22 may be above 125° C., and may be as high as 400° C. Insufficient heat to elevate the temperature of the bonding agent 22 to the securing temperature may result in insufficient bonding, thus the bonding agent 22 may not provide sufficient strength to prevent movement of the optical fiber 16 within the ferrule bore 26. In this manner, the end portion 14 of the optical fiber 16 may not be located precisely in the ferrule 12 and attenuation may occur. It is noted that the maximum strength provided by the bonding agent 22 may occur when the bonding agent 22 reaches a glass transition temperature of the bonding agent 22 when fully activated (e.g., cured).

Figure 2B:
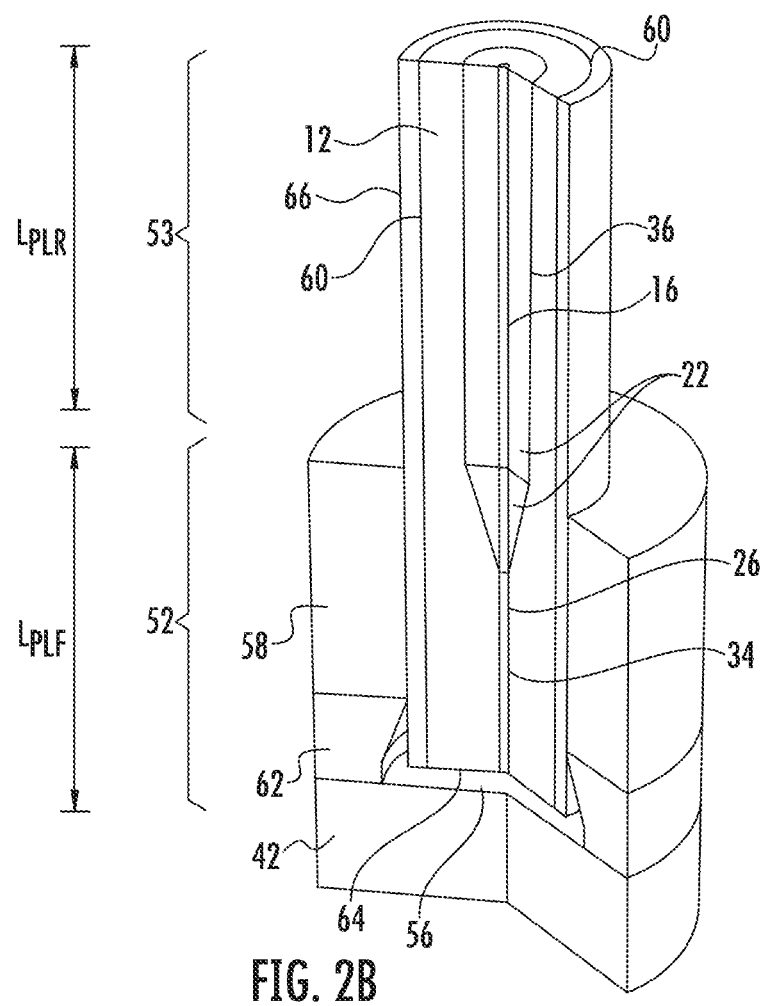

In this regard, FIGS. 2A and 2B are partial cutaway views of the exemplary fiber optic ferrule disposed in the exemplary conductive sub-assembly of FIG. 1B. In the example of FIGS. 2A and 2B, the conductor contact element 58 has a substantially annular cross-section having an internal diameter of $D_C$. The conductor contact element 58 is configured to matingly receive a complementary cylindrical ferrule 12 having an external diameter equal or substantially equal (i.e., within 0.5 microns) to $D_C$. It should be understood, however, that other shapes and cross-sections are contemplated, provided that a portion of an exemplary conductive element 50 is configured to deliver energy to a bonding agent 22 in a ferrule 12 via thermal transfer.

Figure 3:
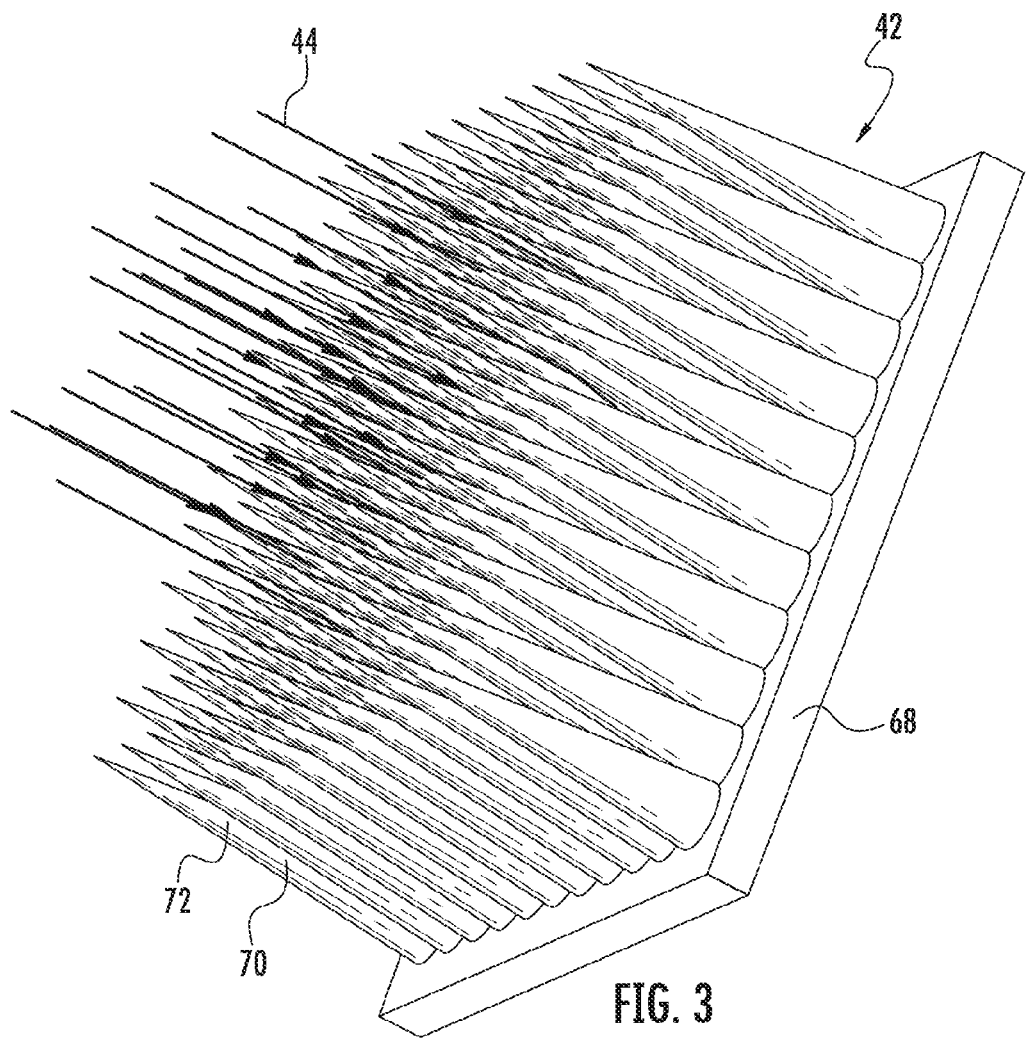
FIG. 3 illustrates a detailed view of a portion of an exemplary laser beam absorber according to FIGS. 1B, 2A, and 2B.

It should also be understood that the LBA 42 may be configured in a number of different ways. In this regard, FIG. 3 illustrates a detailed view of a portion of an exemplary LBA 42. LBA 42 includes a conductive substrate 68 having a matrix of conical elements 70 disposed thereon. As light rays 44 bombard the LBA 42, individual light rays 44 are absorbed by an absorbent coating 72 coating the conical elements 70. In addition, the steep angle of the conical surfaces of conical elements 70 causes unabsorbed light rays 44 to be reflected downward toward the conductive substrate 68 into a dense array of conical elements 70. Thus, light rays 44 that are not absorbed immediately may be subsequently absorbed by nearby conical elements 70 as the light rays 44 are reflected deeper and deeper into the matrix of conical elements 70. In one embodiment, conical elements 70 are made of a conductive material so that a maximum amount of heat absorbed by absorbent coating 72 can be transferred to the conductive substrate 68, and in turn conducted to the conductive element 50.

It should be understood, however, that any number of alternative laser beam absorber designs may be used in place of, or as a supplement to, the design of laser beam absorber 42. For example, a simple ceramic element may also function as a laser beam absorber, such that light rays 44 from laser beam 46 can be converted into heat energy and employed by conductive element 50. In other embodiments, a carbon insert (or other conductive material that efficiently absorbs laser light) in a copper sleeve may be used as an alternative laser beam absorber.

In this regard, FIGS. 4A-4C are a perspective view, cutaway side view, and a front view, respectively, of a variant of the ferrule 12 depicted in FIG. 1A, and illustrating the at least a partial length 52 of the ferrule 12 where the laser beam 46 is to be incident. The at least a partial length 52 may be cylindrically shaped covering a length $L_{PL}$ of the ferrule 12 extending from the front end 30 of the ferrule 12. In this embodiment, the ferrule 12 includes a retention groove 74 configured to mate and lock with a complementary portion of the ferrule holder 55 (FIG. 1A). As shown in FIG. 4C, the at least a partial length 52 may cover the circumference of the ferrule 12, thus providing opportunities for heat to travel in multiple radial directions to heat the bonding agent 22 within the ferrule bore 26. Accordingly, the incident energy from the laser beam 46 around the circumference will more efficiently heat the ferrule 12, and thereby a lower energy intensity of the laser beam 46 may be used to avoid damage to the fiber optic connector housing 54.

With reference back to FIG. 1B, at least a portion of the energy of the laser beam 46 is absorbed and flows through the ferrule 12 via conductive heat transfer to the inner surface 24 of the ferrule bore 26 to thermally activate (e.g., thermally cure) the bonding agent 22. Specifically, the heat arriving at the bonding agent 22 raises the temperature of the bonding agent 22 to at least the securing temperature to facilitate securing. In this way, the optical fiber 16 is secured to the ferrule 12 without damaging the ferrule 12 or components of the fiber optic connector housing 54.

Figure 5A:
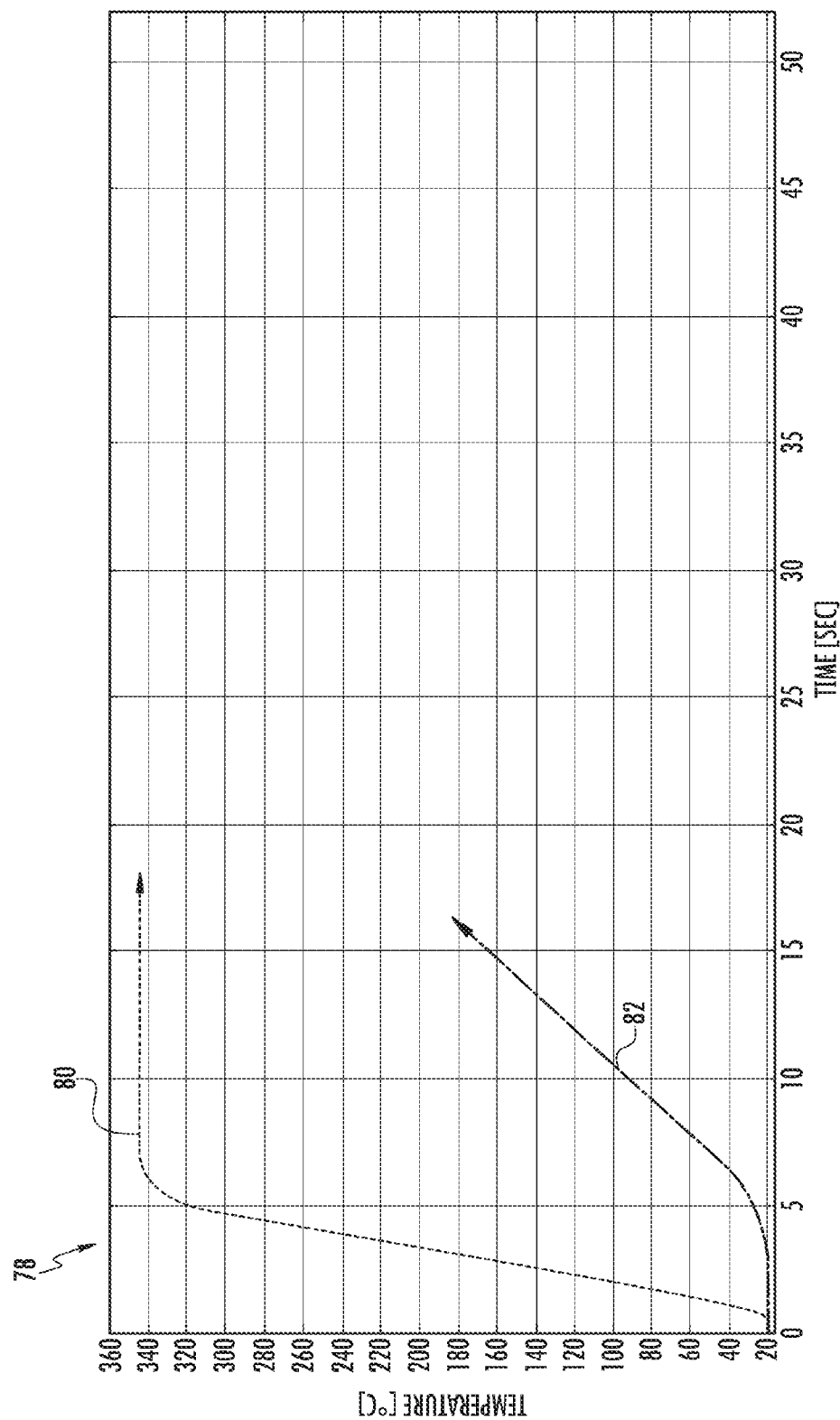
Figure 5B:
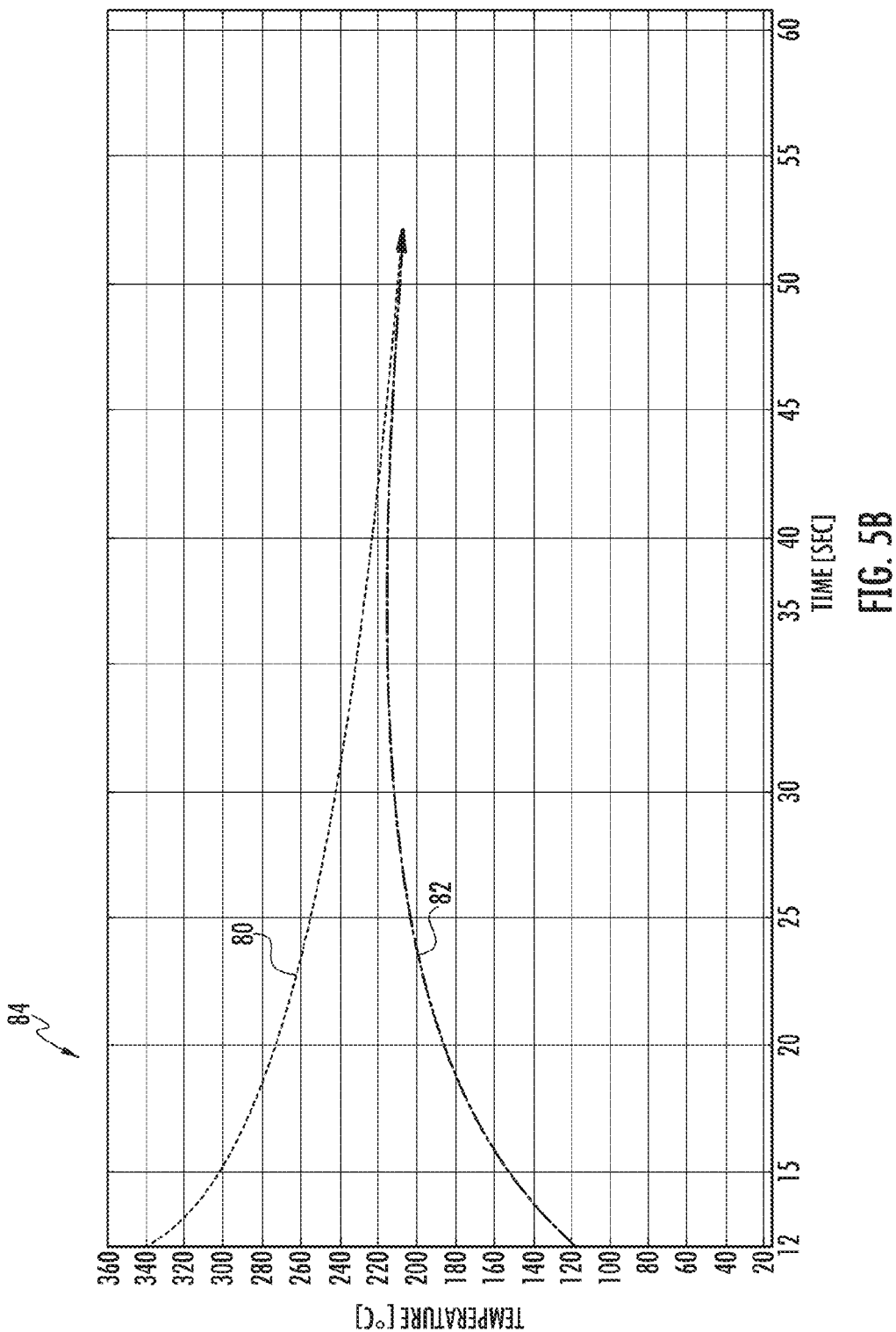

In this regard, FIGS. 5A-5C illustrate heating and cooling profiles, and a combined heating and cooling profile of the ferrule 12 and the connector housing 54 over time as laser beam energy is applied to the LBA 42 and propagated through the conductive element 50 and into the ferrule 12 as heat. FIG. 5A illustrates a heating profile graph 78 of degrees Celsius (° C.) vs. time (seconds) for both the ferrule tip temperature 80 and the ferrule rear end temperature 82. As shown in FIG. 5A, the ferrule tip 64 is quickly heated to a maximum temperature because the conductive assembly 40 is in direct contact with the front end 30 of ferrule 12 during heating. The maximum temperature is based on the amount of energy being absorbed from the laser beam 46, and in this example is 340° C., which may correspond to the temperature required to activate a powder-like bonding agent. In other examples the maximum temperature may be 300° C. or more for activating a powder-like bonding agent or other bonding agents.

As heat is added to the ferrule 12 over time, however, a portion of the heat energy propagates through the rear end 28 of the ferrule 12 into the connector housing 54. This transfer of excess heat causes the temperature of the connector housing 54 to rise at a slower rate than the ferrule 12. However, the maximum allowable temperature of the connector housing 54, which may be made of plastic, may be less than the maximum allowable temperature of the ferrule 12 or optical fiber 16, which may be made of glass. In the non-limiting embodiment shown in FIG. 5A, for example, the sufficient laser beam energy is absorbed to heat the front end 30 of the ferrule 12 to a maximum ferrule tip temperature 80 of 340° C., but if the laser is applied to the conductive assembly for too long, the the plastic connector housing 54, which is in contact with the rear end 28 of the ferrule 16, will exceed the maximum allowable temperature of the connector housing 54 of 220° C., which may damage and/or weaken the connector housing 54. Thus, laser beam energy must be applied to the conductive assembly 40 in a quantity and over a time sufficient to activate the bonding agent 22 (340° C. for 5 seconds in this example), but not sufficient to cause the ferrule rear end temperature 82 to exceed the maximum allowable temperature of the connector housing 54, e.g., 220° C.

In this regard, cooling may comprise natural, i.e., passive cooling, or active cooling, for example with a refrigeration source, cooling agent, forced air convection, or other cooling method. FIG. 5B illustrates a cooling profile graph 84 for passive cooling of the ferrule tip temperature 80 and ferrule rear end temperature 82. Additionally, FIG. 5B presupposes that the ferrule tip temperature 80 and ferrule rear end temperature 82 have been heated to approximately 340° C. and 120° C. respectively, as shown by FIG. 5A, and that the laser beam has been removed (e.g., switched off) at t=12s. As shown by the cooling profile graph 84, the ferrule tip temperature 80 drops gradually over time after the laser beam is removed, but the ferrule rear end temperature 82 continues to rise for as long as the ferrule tip temperature 80 exceeds ferrule rear end temperature 82. After a time period with no laser beam energy added, the ferrule rear end temperature 82 and ferrule tip temperature 80 normalize and drop toward room temperature over time. It can be seen from FIG. 5B that, in this example, when the starting temperture of the bonding agent 22 is 340° C. and the ferrule rear end temperature 82 is approximately 120° C., the ferrule rear end temperature 82 never exceeds the maximum allowable temperature of 220° C. of the connector housing 54, and gradually returns to room temperature along with the ferrule tip temperature 80.

FIG. 5C illustrates a combined heating/cooling plot 86 in which laser beam energy is applied to the conductive assembly 40 to heat the bonding agent 22 to 340° C. and maintain the bonding agent 22 at that temperature for 5 seconds (12 seconds total), sufficient to activate the bonding agent 22 and bond the optical fiber 16 in the ferrule 12. After 12 seconds, the laser beam 46 is turned off, and the ferrule tip temperature 80 drops over time while the ferrule rear end temperature 82 continues to rise to a maximum temperature of 220° C. Because the maximum ferrule rear end temperature 82 does not exceed the maximum allowable temperature of the connector housing 54 (220° C.), it can be seen that, in this exemplary embodiment, laser beam energy can be applied to a conductive assembly 40 sufficient to bond an optical fiber 16 in the ferrule 12, and without damaging the connector housing 54.

It should be understood that other epoxies and bonding agents having different securing temperatures may be used. For example, another common epoxy resin has a securing temperature of 125° C. Based on the desired securing temperature and on a maximum allowable temperature of a connector housing, a laser beam can be applied to an exemplary conductive assembly in different intensities and time periods as desired.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of bonding an optical fiber in a ferrule comprising:
    disposing an optical fiber and a bonding agent in a bore of a ferrule;
    disposing the ferrule at least partially in a conductive assembly such that a conductive element of the conductive assembly contacts a portion of the ferrule;
    directing a laser beam at a laser beam absorber of the conductive assembly, wherein the laser beam absorber is thermally connected to the conductive element, and wherein energy from the laser beam is absorbed by the laser beam absorber so that heat is transferred through the conductive element to the ferrule to bring the bonding agent to a securing temperature; and
    cooling the bonding agent to secure the optical fiber in the bore of the ferrule.

2. The method of claim 1, wherein the bonding agent is disposed in at least a bonding agent funnel of the ferrule, and further wherein the portion of the ferrule in contact with the conductive element extends substantially between a tip of the ferrule and at least the bonding agent funnel when the ferrule is at least partially disposed in the conductive assembly.

3. The method of claim 1, wherein a tip of the ferrule does not contact the conductive element when the ferrule is disposed in the conductive assembly.

4. The method of claim 1, wherein the conductive element contacts the portion of the ferrule substantially around a perimeter of the ferrule when the ferrule is disposed in the conductive assembly.

5. The method of claim 1, wherein the bonding agent comprises an epoxy resin configured to be activated when heated to a securing temperature between 85° C. and 200° C.

6. The method of claim 1, wherein the ferrule is at least partially disposed within a fiber optic connector housing when the laser beam is directed at the laser beam absorber.

7. The method of claim 6, wherein the conductive element transfers heat to the portion of the ferrule such that the bonding agent reaches the securing temperature without the fiber optic connector housing exceeding a maximum operating temperature.

8. The method of claim 7, wherein the conductive element transfers heat to the portion of the ferrule such that the bonding agent reaches a securing temperature of at least 300° C. or more without the fiber optic connector housing exceeding a maximum operating temperature of 220° C. or less.

9. The method of claim 1, wherein cooling the bonding agent comprises discontinuing directing a laser beam at a laser beam absorber, thereby permitting the bonding agent to cool to an ambient temperature.

10. The method of claim 1, wherein cooling the bonding agent comprises removing the ferrule from the conductive assembly.

11. A system for producing a fiber optic cable assembly, comprising:
    a ferrule having a bore with a bonding agent disposed therein;
    an optical fiber disposed within the bore of the ferrule and at least partially surrounded by the bonding agent;
    a laser configured to emit a laser beam; and
    a conductive assembly comprising:
        a laser beam absorber configured to absorb energy from the laser beam as heat; and
        a conductive element connected to the laser beam absorber and contacting a portion of the ferrule, the conductive element being configured to transfer heat from the laser beam absorber to the ferrule to activate the bonding agent and thereby secure the optical fiber to the ferrule.

12. The system of claim 11, wherein the bonding agent is disposed in at least a bonding agent funnel of the ferrule, and further wherein the portion of the ferrule in contact with the conductive element extends substantially between a tip of the ferrule and the at least a bonding agent funnel.

13. The system of claim 11, wherein a tip of the ferrule does not contact the conductive element.

14. The system of claim 11, wherein the conductive element contacts the portion of the ferrule substantially around a perimeter of the ferrule.

15. The system of claim 11, wherein a maximum operating temperature of a fiber optic connector housing is 220° C. or less, and a securing temperature of the bonding agent is 300° C. or more.

* * * * *